United States Patent [19]
Sato et al.

[11] 4,097,785
[45] Jun. 27, 1978

[54] MAGNETIC-TAPE-TRANSPORT APPARATUS

[75] Inventors: Mituhiro Sato, Yokohama; Tomomi Kato, Tokyo, both of Japan

[73] Assignee: Sansui Electric Co., Ltd., Tokyo, Japan

[21] Appl. No.: 740,059

[22] Filed: Nov. 8, 1976

[30] Foreign Application Priority Data

Nov. 13, 1975 Japan .......................... 50-154369[U]

[51] Int. Cl.² ............................................. B65H 77/00
[52] U.S. Cl. ........................................ 318/89; 318/372; 318/7
[58] Field of Search .................... 318/7, 372, 88, 89

[56] References Cited
U.S. PATENT DOCUMENTS

| | | | |
|---|---|---|---|
| 3,501,682 | 3/1970 | Jacoby | 318/7 |
| 3,873,896 | 3/1975 | Jennings | 318/7 |
| 3,946,291 | 3/1976 | Marheine | 318/7 |
| 4,034,272 | 7/1977 | Steward | 318/7 |

*Primary Examiner*—B. Dobeck
*Attorney, Agent, or Firm*—Harris, Kern, Wallen & Tinsley

[57] ABSTRACT

Disclosed is a tape-transport apparatus wherein a first brake is provided for a reel for winding a magnetic tape thereon, the reel being operatively coupled to a first DC motor; a second brake is provided for a reel for supplying the magnetic tape, the reel being operatively coupled to a second DC motor; means is provided which is adapted to impart the retarding force to the second DC motor when an electromotive force, which is generated by the rotation of the first DC motor due to its inertia whenever the power supply to the first DC motor is interrupted, is in excess of a predetermined level; and there is provided means which is adapted to operate the first and second brakes when the magnitude of the electromotive force reaches a predetermined value, thereby stopping the transport of the tape.

6 Claims, 2 Drawing Figures

MAGNETIC-TAPE-TRANSPORT APPARATUS

BACKGROUND OF THE INVENTION

The present invention relates to generally a magnetic tape-transport apparatus and more particularly to a tape-transport apparatus wherein two reels and two DC motors operatively coupled thereto are used to control the transport of the magnetic tape.

In open-reel and cassette tape recorders, the stable transport of the tape must be ensured in the recording and playback modes, and in the rewind or fast-forward mode in which the tape is transported at a faster speed than in the recording or playback mode it is essential that the tape be stopped in a stable and smoother manner.

There has been devised and demonstrated the so-called three-motor type tape recorder wherein three independent motors are provided for rewinding, fast-forward and driving a capstan and mechanical brakes for these motors and actuated to control them in response to the output signals from tachometers, each provided for each spindle or reel shaft when the tape is to be stopped in the rewind or fast-forward mode when the tape is transported at a fast speed. However, the tape recorders of the type described have an inherent defect that they are complex in construction with the resultant increase in cost because AC motors must be used as driving motors and the tachometers must be incorporated.

In general, severe mechanical dimensional limits are imposed on cassette tape recorders. Therefore the width of the magnetic tape used in the cassette tape recorders is narrower, the hubs upon which are mounted reels must be made compact in size and light in weight and the frictional resistance between the tape and a casing is great so that the motor used for rewinding is retarded only by a mechanical brake which in turn is operatively coupled to an operating lever. This arrangement has been generally employed in order to provide the tape recorders simple in construction and reduce the cost.

There have been also well known in the art the cassette tape recorders of the type employing special magnetic tapes with wider widths and wherein the magnetic tape is housed within a casing in such a way that the friction between them may be minimized or eliminated. Owing to the heavy weight of the special magnetic tape and the low friction, special care must be taken into consideration in order to ensure the stable and dependable control of the tape transport from the time when the rewinding or fast-forward is started to the time when the tape is completely stopped.

In view of the above, one of the objects of the present invention is to provide a magnetic tape-transport apparatus which may ensure the stable and smooth control on the tape transport speed from the time when the rewinding or fast-forward is started to the time when the tape is completely stopped and which may substantially overcome the above and other problems encountered in the conventional tape recorders.

SUMMARY OF THE INVENTION

Briefly stated, the present invention provides to the above and other ends a magnetic tape-transport apparatus of the type including means adapted to transport the magnetic tape from one reel to another and vice versa, the apparatus comprising a first DC motor having permanent magnet poles and operatively coupled to a tape-winding reel for rotating the same; a second DC motor having permanent magnet poles and operatively coupled to a tape-unwinding reel for rotating the same; a first brake and a second brake for said first and second DC motors, respectively, adapted to apply the retarding forces to them to stop them when the tape transport is to be stopped; first control means adapted to supply DC power to said first DC motor for rotating it in a first direction, thereby winding the magnetic tape on the tape-winding reel operatively coupled to said first DC motor; a second control means adapted to interrupt the DC power supply to the first DC motor, first DC motor retarding means adapted to retard the rotation in the first direction of the first DC motor due to its inertia including second DC motor retarding means adapted to retard the rotation in the first direction of the second DC motor during a time period in which the magnitude of electromotive force generated by the rotation of the first DC motor due to its inertia after the DC power supply thereto has been interrupted is higher than a predetermined level; and means adapted to operate the first and second brakes so as to stop the transport of the tape when the magnitude of electromotive force reaches the predetermined level.

According to the present invention, DC motors with permanent magnet poles are used for driving the reels; in response to the electromagnetic force generated by the first DC motor due to its inertia after the DC power supply thereto has been interrupted, a switching circuit is so actuated as to apply the retarding force through the second DC motor and the tension of the tape to the first DC motor; and the brakes are operated when the electromotive force decreases below the predetermined level or in other words the timing for operating the brakes is depending upon the rotational speed of the reels. Therefore the present invention provides a portable tape recorder which is very simple in construction to permit the elimination of tachometers and inexpensive to manufacture yet capable of the stable and smooth control of the transport and stop of the tape.

BRIEF DESCRIPTION OF THE DRAWING

Same reference numerals are used to designate similar parts throughout the figures.

DESCRIPTION OF THE PREFERRED EMBODIMENTS

Figure 1:
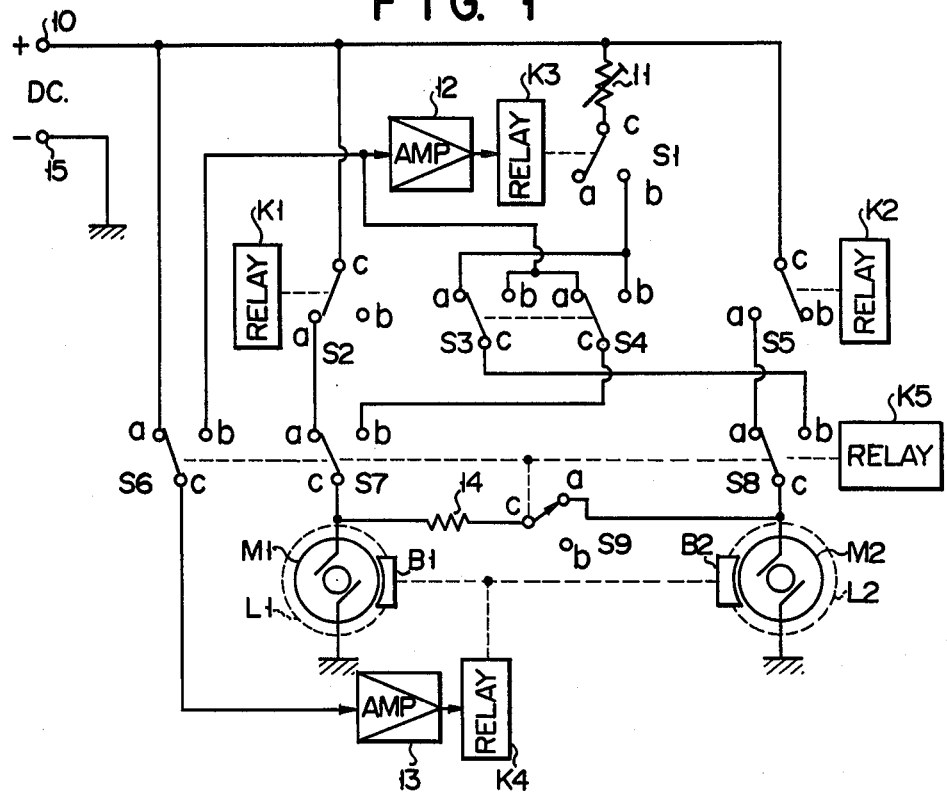
FIGS. 1 and 2 are circuit diagrams of a first and a second embodiments, respectively, of the magnetic tape-transport apparatus in accordance with the present invention.

First Embodiment, FIG. 1

In FIG. 1, there is shown a circuit diagram of a first embodiment of the present invention. For the sake of simplicity and clearness, only the components associated with the rewind and fast-forward modes are shown.

The tape-transport apparatus includes a motor M1 for rotating a reel L1 and a motor M2 for rotating a reel L2. The motors M1 and M2 are substantially similar in construction and are of the type having poles made of permanent magnet. One of the pair of brushes of each motor M1 or M2 is grounded, and each motor is provided with a mechanical brake B1 or B2 for stopping the motor when operated in a manner to be described in detail hereinafter.

The tape-transport apparatus in accordance with the present invention further includes changeover switches S1 to S9 each having two stationary contacts $a$ and $b$ and a movable contact or lever $c$ operatively coupled to relays K1, K2, K3 and K5 to be described below for closing either of the stationary contact $a$ or $b$.

When the relay K1 is energized, it causes the movable contacts $c$ of the switch S2, S3 and S4 to close the corresponding stationary contacts $a$. In like manner, when energized, the relay K2 causes the movable contact $c$ of the switch S5 to close the stationary contact $a$. When the relay K3 is energized, it causes the movable contact $c$ of the switch S1 to close the stationary contact $b$. When the relay K5 is energized, it causes the movable contacts $c$ of the switches S6 through S9 to close the stationary contacts $b$.

In addition to the above relays K1, K2, K3 and K5, there is provided a relay K4 which serves to operate both the brakes B1 and B2 under a condition described later.

The other brush of the first motor M1 is connected to the movable contact $c$ of the switch S7 whose stationary contact $a$ in turn is connected to the stationary contact $a$ of the switch S2 whose movable contact $c$ is connected to the positive terminal 10 of a DC power supply DC whose negative terminal 15 is grounded. The other brush of the second motor M2 is connected to the movable contact $c$ of the switch S8 whose stationary contact $a$ is connected to the stationary contact $a$ of the switch S5 whose movable contact $c$ is connected to the positive terminal 10 of the power supply DC. The movable contact $c$ of the switch S1 is connected to the positive terminal 10 through an adjustable resistor 11 (which is defined in this specification as "a resistor whose value may be set to a desired value, but no resetting is made after once set").

The stationary contact $a$ of the switch S6 is connected also to the positive terminal 10 while the stationary contact $b$ is connected to the input terminal of a first amplifier 12 whose output terminal is connected to the input terminal of the relay K3. The contact $c$ of the switch S6 is connected to the input terminal of a second amplifier 13 whose output terminal is in turn connected to the input terminal of the relay K4.

The stationary contact $a$ of the switch S3 as well as the stationary contact $b$ of the switch S4 are connected to the stationary contact $b$ of the switch S1, whereas the stationary contact $b$ of the switch S3 as well as the stationary contact $a$ of the switch S4 are connected to the stationary contact $b$ of the switch S6. The contacts $c$ of the switches S3 and S4 are connected to the stationary contacts $b$ of the siwtches S8 and S7, respectively.

The contact $c$ of the switch S9 is connected through a resistor 14 to the other brush of the first motor M1 while the stationary contact $a$, to the other brush of the motor M2.

FIG. 1 shows the rewind mode; that is, the state in which the tape on the take-up reel L2 is being rewound on the supply reel L1 because the first relay K1 is energized upon operation of a rewind lever or pushbutton (not shown) so that the movable contacts $c$ of the switches S2, S3 and S4 are closing the stationary contacts $a$. Then the voltage from the DC power supply DC is applied through the switches S2 and S7 to the motor M1 so that the latter is rotated in the rewind direction, whereby the magnetic tape is rewound on the supply reel L1 at high speed. Concurrently, the motor M2 is supplied with a very small voltage which is dependent upon the preset value of the resistor 14 so that the motor M2 produces the torque in the take-up direction. As a result of this, the magnetic tape is imparted with the tension which is also a function of the value of the resistor 14.

To stop rewinding, one operates a stop pushbutton or lever (not shown) to energize the relay K5 so that the movable contacts $c$ of the switches S6, S7, S8 and S9 are changed over to the stationary contacts $b$ and consequently the supply of power to the first motor M1 is interrupted. However, the motor M1 keeps rotating by its inertia, generating the electromotive force which is applied through the contacts $b$ and $c$ of the switch S7 and the contacts $c$ and $a$ of the switch S4 to the input terminal of the first amplifier 12. Then, in response to the output from the first amplifier 12, the relay K3 is energized so that the movable contact $c$ of the switch S1 is changed over to close the stationary contact $b$. As a result, the positive terminal 10 of the DC power supply DC is connected through the adjustable resistor 11, the contacts $c$ and $b$ of the switch S1, the contacts $a$ and $c$ of the switch S3 and the contacts $b$ and $c$ of the switch S8 to the other brush of the second motor M2 so that the latter produces the torque in the takeup direction. This torque is transmitted through the takeup reel L2 to the magnetic tape to retard the movement thereof to the left in FIG. 1, whereby the rotation of the first motor M1 by its inertia and consequently the electromotive force produced thereby may be decreased. When the electromotive force is decreased to a predetermined level, the output from the amplifier 12 is decreased accordingly so that the relay K3 is deenergized and consequently the movable contact $c$ of the switch S1 is changed over to the stationary contact $a$. In response to the decrease in magnitude of the electromotive force applied to the second amplifier 13 through the contacts $c$ and $b$ of the switch S7, the contacts $c$ and $a$ of the switch S4 and the contacts $b$ and $c$ of the switch S6, the relay K4 is caused to operate both the brakes B1 and B2 so that the latter may be pressed against the spindles of the reels L1 and L2 and consequently the revolutions of the reels L1 and L2 are completely stopped.

The relay K4 is mechanically and electromagnetically coupled to the brakes B1 and B2 as indicated by the broken lines, and when the output from the second amplifier 13 drops below a predetermined level, it causes the brakes B1 and B2 to retard the rotation of the reels L1 and L2.

Next the mode of fast-forward will be described. Prior to the changeover to the fast-forward mode, the stationary contacts $a$ of the switches S1, S6, S7, S8 and S9 are closed while the stationary contacts $b$ are closed in the switches S2, S3, S4 and S5. Upon operation of a fast-forward pushbutton or lever (not shown), the relay K2 is energized so that the movable contacts $c$ of the switches S5, S3 and S4 close the stationary contacts $a$. As a result, the motor M2 is rotated in the take-up direction so that the magnetic tape on the supply reel L1 is taken up on the take-up reel L2 at a high speed. Concurrently, a very weak current flows into the motor M1 through the switch S9 and the resistor 14 so that the motor M1 produces the torque in the rewind direction and consequently the magnetic tape is imparted with suitable tension.

To stop the fast-forward transport, the relay K5 is energized so that the movable contacts $c$ of the switches S6, S7, S8 and S9 are changed over to close corresponding stationary contacts $b$ so that the electromotive force produced by the motor M2 due to its inertia is applied to the first amplifier 12 through the contacts b and c of the switch S8 and the contacts b and c of the switch S3. In response to the output from the first amplifier 12 the relay K3 is energized to cause the movable contact c of the switch S1 to close the stationary contact b. Then the positive terminal 10 of the DC power source is connected through the variable resistor 11 through the contacts c and b of the switches S1, S4 and S7 to the other brush of the first motor M1 so that the latter produces the torque in the rewind direction and consequently the retarding force is imparted to the take-up reel L2 in the rewind direction. As a result, the magnitude of the electromotive force produced by the second motor M2 is decreased, and as with the case of the rewind mode when the electromotive force decreases below a predetermined level, the movable contact c of the switch S1 is changed over to close the contact a. Simultaneously the electromotive force applied to the second amplifier 13 is reduced to the predetermined level, thereby the brakes B1 and B2 are operated to bring the reels L1 and L2 to rest for completely stopping the tape transport.

Figure 2:
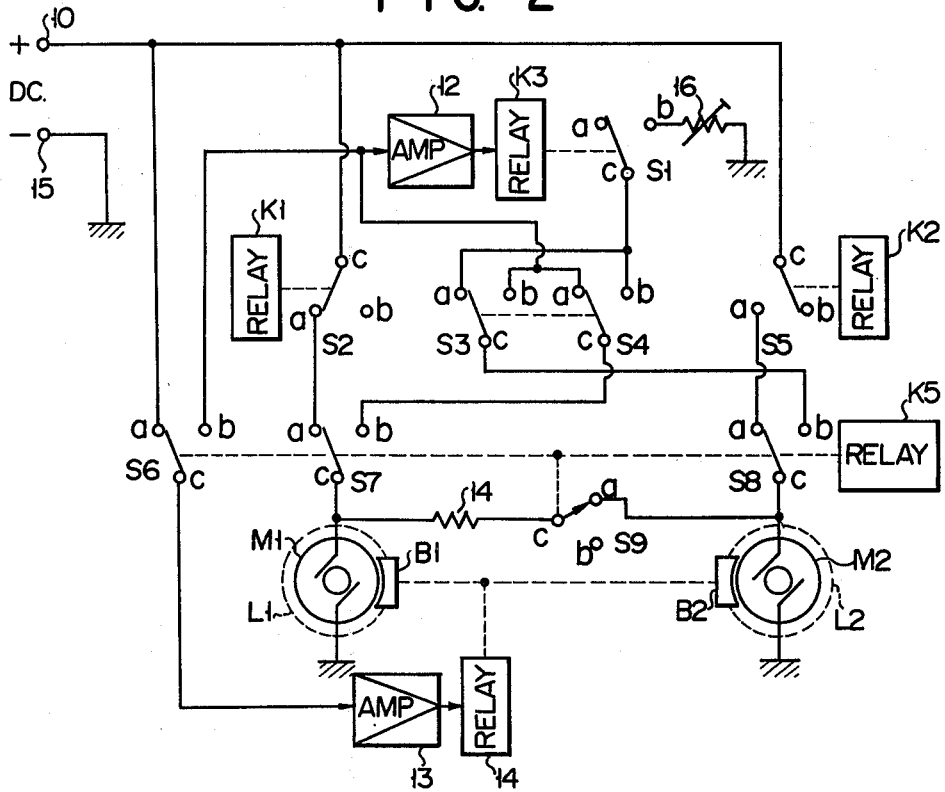

Second Embodiment, FIG. 2

The second embodiment shown in FIG. 2 is substantially similar in construction to the first embodiment shown in FIG. 1 except that the contact c of the switch S1 is connected to the contact a of the switch S3 and to the contact i b of the switch S4 whereas the contact b is connected to one end of a load resistor 16 whose other end is grounded. Whereas in the first embodiment the power is supplied through the resistor 11 to the second or take-up motor M2 to produce the braking torque when the rotation due to the inertia of the first or rewind motor M1 is retarded, in the second embodiment shown in FIG. 2 the electromotive force produced by the second or take-up motor is dissipated through the load resistor 16, whereby the rotation due to the inertia of the first or rewind motor may be retarded.

More particularly, when the relay K5 is energized during the rewind mode, the first or rewind motor M1 is deenergized and the electromotive force produced thereby is applied through the contacts c and b of the switch S7 and the contacts c and a of the switch S4 to the first amplifier 12. Then in response to the output from the first amplifier 12, the relay K3 is energized to cause the movable contact c of the switch S1 to close the stationary contact b so that the electromotive force generated by the second or take-up motor M2 is applied through the contacts c and b of the switch S8, the contacts c and a of the switch S3 and the contacts c and b of the first switch S1 to the load resistor 16 and is dissipated therethrough. As a result, the rotation in the rewind direction of the second or take-up motor M2 is retarded and, consequently, so is the rotation of the first or rewind motor M1 in the rewind direction.

It should be noted that in both the first and second embodiments, the first and second amplifiers 12 and 13 may be eliminated.

What we claim is:

1. In a tape-transport apparatus of the type for winding a magnetic tape unwound from one reel on the other reel and vice versa, an improvement for stopping the apparatus comprising:

(a) a first DC motor having permanent magnet poles and operatively coupled to a tape-winding reel for rotating the same;
   (b) a second DC motor having permanent magnet poles and operatively coupled to a tape-unwinding reel for rotating the same;
   (c) a first brake and a second brake for said first and second DC motors, respectively, adapted to apply the retarding forces to them to stop them when the tape transport is to be stopped;
   (d) first control means adapted to supply DC power to said first DC motor for rotating it in a first direction, thereby winding the magnetic tape on said tape-winding reel operatively coupled to said first DC motor;
   (e) second control means adapted to interrupt the DC power supply to said first DC motor;
   (f) first DC motor retarding means adapted to retard the rotation in said first direction of said first DC motor due to its inertia when said second control means interrupts power to said first DC motor, including second DC motor retarding means adapted to retard the rotation in said first direction of said second DC motor during a time period in which the magnitude of electromotive force generated by the rotation of said first DC motor due to its inertia after the DC power supply thereto has been interrupted is higher than a predetermined level; and
   (g) means adapted to operate said first and second brakes when the magnitude of electromotive force reaches said predetermined level so as to stop the transport of the tape.

2. An improvement as set forth in claim 1 wherein said second DC motor retarding means comprises:
   (a) switching circuit means adapted to be closed when the magnitude of said electromotive force is in excess of said predetermined level; and
   (b) torque generating circuit means rewponsive to the closing of said switching circuit means for supplying DC power to said second DC motor so as to cause it to generate the torque in a second direction.

3. An improvement as set forth in claim 1 wherein said second DC motor retarding means comprises:
   (a) switching circuit means adapted to be closed when the magnitude of electromotive force is in excess of said predetermined level; and
   (b) circuit means including a resistor adapted to dissipate the electromotive force generated by the rotation in said first direction of said second DC motor when said switching circuit means is closed.

4. An improvement as set forth in claim 1 wherein said means adapted to operate said first and second brakes includes:
   (a) a relay which is operatively coupled to said first and second brakes and is adapted to operate said first and second brakes when the magnitude of electromotive force applied to said relay reaches said predetermined level.

5. An improvement as set forth in claim 1 further comprising means adapted to supply small DC power to said second DC motor, when said first control means is supplying DC power to said first DC motor, so as to cause said second DC motor to generate the torque in a second direction, whereby the magnitude tape may be imparted with suitable tension.

6. In a tape-transport apparatus of the type for winding a magnetic tape unwound from one reel on the other reel and vice versa, an improvement for stopping the apparatus comprising:
  (a) a first DC motor having permanent magnet poles and operatively coupled to a tape-winding reel for rotating the same;
  (b) a second DC motor having permanent magnet poles and operatively coupled to a tape-unwinding reel for rotating the same;
  (c) a first brake and a second brake for said first and second DC motors, respectively, adapted to apply the retarding forces to them to stop them when the tape transport is to be stopped;
  (d) first control means adapted to supply DC power to said first DC motor for rotating it in a first direction, thereby winding the magnetic tape on said tape-winding reel operatively coupled to said first DC motor;
  (e) second control means adapted to interrupt the DC power supply to said first DC motor;
  (f) a third control means adapted to supply small DC power to said second DC motor when said first control means is supplying DC power to said first DC motor so as to cause said second DC motor to generate a torque in a second direction, whereby the magnetic tape may be imparted with suitable tension;
  (g) first DC motor retarding means adapted to retard the rotation in said first direction of said first DC motor due to its inertia when said second control means interrupts power to said first DC motor, including second DC motor retarding means with switching means adapted to disconnect said small DC power and to retard the rotation in said first direction of said second DC motor during a time period in which the magnitude of electromotive force generated by the rotation of said first DC motor due to its inertia after the DC power supply thereto has been interrupted is higher than a predetermined level; and
  (h) means adapted to operate said first and second brakes when the magnitude or electromotive force reaches said predetermined level so as to stop the transport of the tape.

* * * * *